(12) United States Patent
Adachi et al.

(10) Patent No.: US 11,188,743 B2
(45) Date of Patent: Nov. 30, 2021

(54) IMAGE PROCESSING APPARATUS AND IMAGE PROCESSING METHOD

(71) Applicant: CANON KABUSHIKI KAISHA, Tokyo (JP)

(72) Inventors: Takashi Adachi, Saitama (JP); Taichi Matsui, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/445,429

(22) Filed: Jun. 19, 2019

(65) Prior Publication Data
US 2019/0392206 A1 Dec. 26, 2019

(30) Foreign Application Priority Data
Jun. 21, 2018 (JP) .............................. JP2018-118195

(51) Int. Cl.
*G06K 9/00* (2006.01)
*G06T 7/73* (2017.01)
*G06T 7/60* (2017.01)

(52) U.S. Cl.
CPC ............ *G06K 9/00362* (2013.01); *G06T 7/60* (2013.01); *G06T 7/73* (2017.01)

(58) Field of Classification Search
CPC ........... G06K 9/00362; G06K 9/00335; G06K 9/00221; G06K 9/3233; G06K 9/34; G06K 9/00785; G06K 9/00369; G06K 9/00771; G06K 9/00778; G06K 9/6218; G06K 9/6284; G06K 9/2054; G06K 9/4638;
(Continued)

(56) References Cited

U.S. PATENT DOCUMENTS 9,519,842 B2    12/2016   Mochizuki et al.
10,277,823 B2 *   4/2019   Tsubusaki .......... H04N 5/23218
(Continued)

FOREIGN PATENT DOCUMENTS

CN    101340522 A    1/2009
CN    101795395 A    8/2010
(Continued)

OTHER PUBLICATIONS

The documents were cited in a Sep. 21, 2020 Chinese Office Action, which is enclosed with an English Translation, that issued in Chinese Patent Application No. 201910480578.4.
(Continued)

*Primary Examiner* — Jose L Couso
(74) *Attorney, Agent, or Firm* — Cowan, Liebowitz & Latman, P.C.

(57) ABSTRACT

In order to facilitate setting of an appropriate detection condition in detecting an object included in an image, an image processing apparatus obtains an image captured by an image capturing unit; causes a display unit to display first information representing the number of persons who have a size included in a first range that is a range from a first size to a second size; and accepts an operation of changing the first range by a user. The image processing apparatus causes the display unit to display the first information and second information representing the number of persons who have a size included in a second range that is a range based on the operation by the user.

17 Claims, 5 Drawing Sheets

(58) Field of Classification Search
CPC .. G06K 9/4642; G06K 9/4652; G06K 9/4671; G06K 9/525; G06K 9/4604; G06T 7/73; G06T 7/60; G06T 7/428; G06T 7/74; G06T 7/246; G06T 1/00; G06T 11/00; G06T 2207/30196; G06T 2207/20084; G06T 2207/30232; G06T 2207/30242; G06T 2207/10016; H04N 7/18; H04N 7/188; H04N 5/23219; H04N 5/232; H04N 5/232127; H04N 21/44218; H04W 24/08; H04W 4/021; H04W 4/023; G08G 1/01
See application file for complete search history.

(56) References Cited

U.S. PATENT DOCUMENTS

| | | | | |
|---|---|---|---|---|
| 10,827,127 | B2* | 11/2020 | Tsubusaki | G06K 9/00295 |
| 2009/0158309 | A1* | 6/2009 | Moon | H04N 21/44218 725/12 |
| 2010/0322516 | A1* | 12/2010 | Xu | G06K 9/00778 382/173 |
| 2013/0230245 | A1 | 9/2013 | Matsumoto et al. | |
| 2015/0146921 | A1* | 5/2015 | Ono | H04N 7/18 382/103 |
| 2016/0323532 | A1* | 11/2016 | Gouda | H04N 5/45 |
| 2016/0358027 | A1* | 12/2016 | Hotta | G06K 9/00785 |
| 2017/0257576 | A1* | 9/2017 | Mitsui | H04N 5/272 |
| 2017/0351924 | A1* | 12/2017 | Hotta | H04N 7/18 |
| 2018/0005046 | A1* | 1/2018 | Miyano | G06T 7/246 |
| 2018/0005071 | A1* | 1/2018 | Idrees | G06K 9/00771 |
| 2019/0220673 | A1* | 7/2019 | Ikeda | G06K 9/00778 |
| 2020/0050872 | A1* | 2/2020 | Ikeda | G06K 9/66 |
| 2020/0202139 | A1* | 6/2020 | Ikeda | G06T 1/00 |
| 2021/0065351 | A1* | 3/2021 | Yamaji | G06K 9/00 |

FOREIGN PATENT DOCUMENTS

| | | |
|---|---|---|
| CN | 102968266 A | 3/2013 |
| CN | 104902252 A | 9/2015 |
| CN | 105122180 A | 12/2015 |
| CN | 303628174 A | 3/2016 |
| CN | 107273849 A | 10/2017 |
| CN | 107431762 A | 12/2017 |
| CN | 107438173 A | 12/2017 |
| JP | 2018-088049 A | 6/2018 |

OTHER PUBLICATIONS

Tong Zhu, "Police Technology", Issue 5, a statistical method for the number of people in the venue of major events based on region alignment, http://www.cnki.net, published on May 2016 (4 pages total).
Kunjun Song, "Shanghai Railway Science and Technology", Issue 3, a fast algorithm for the number of people in the video occlusion prevention based on feature screening and contour analysis, http://www.cnki.net, published Mar. 2016 (4 pages total).

* cited by examiner

FIG. 3

| | EDIT (CORRECTION) | EDIT (ADDITION) | DELETE |
|---|---|---|---|
| INITIAL STATE | ▭ | | ▭ |
| DURING SETTING | ▭ | ▭ | ▭ |
| AFTER APPLICATION | ▭ | ▱ | |

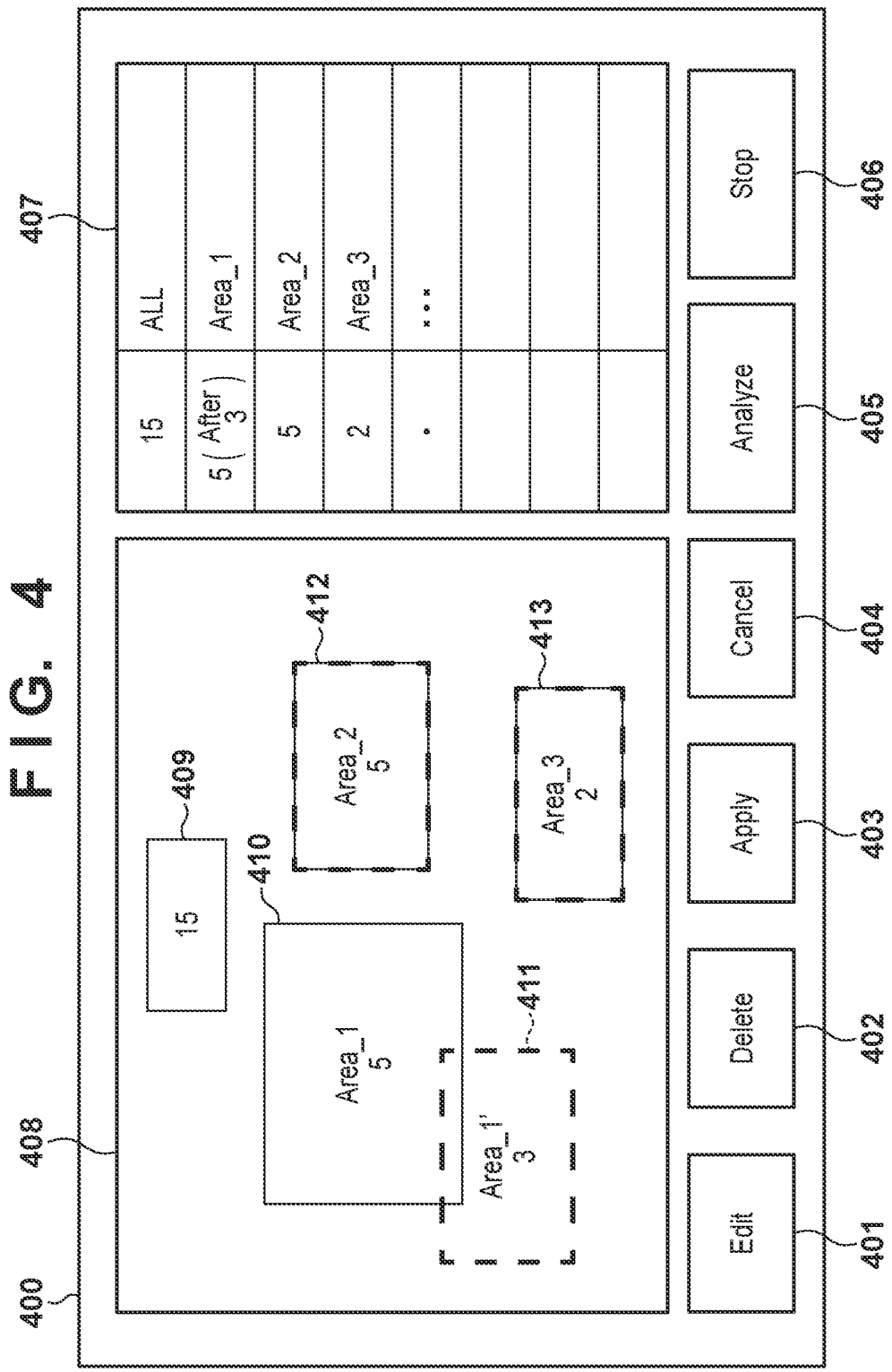

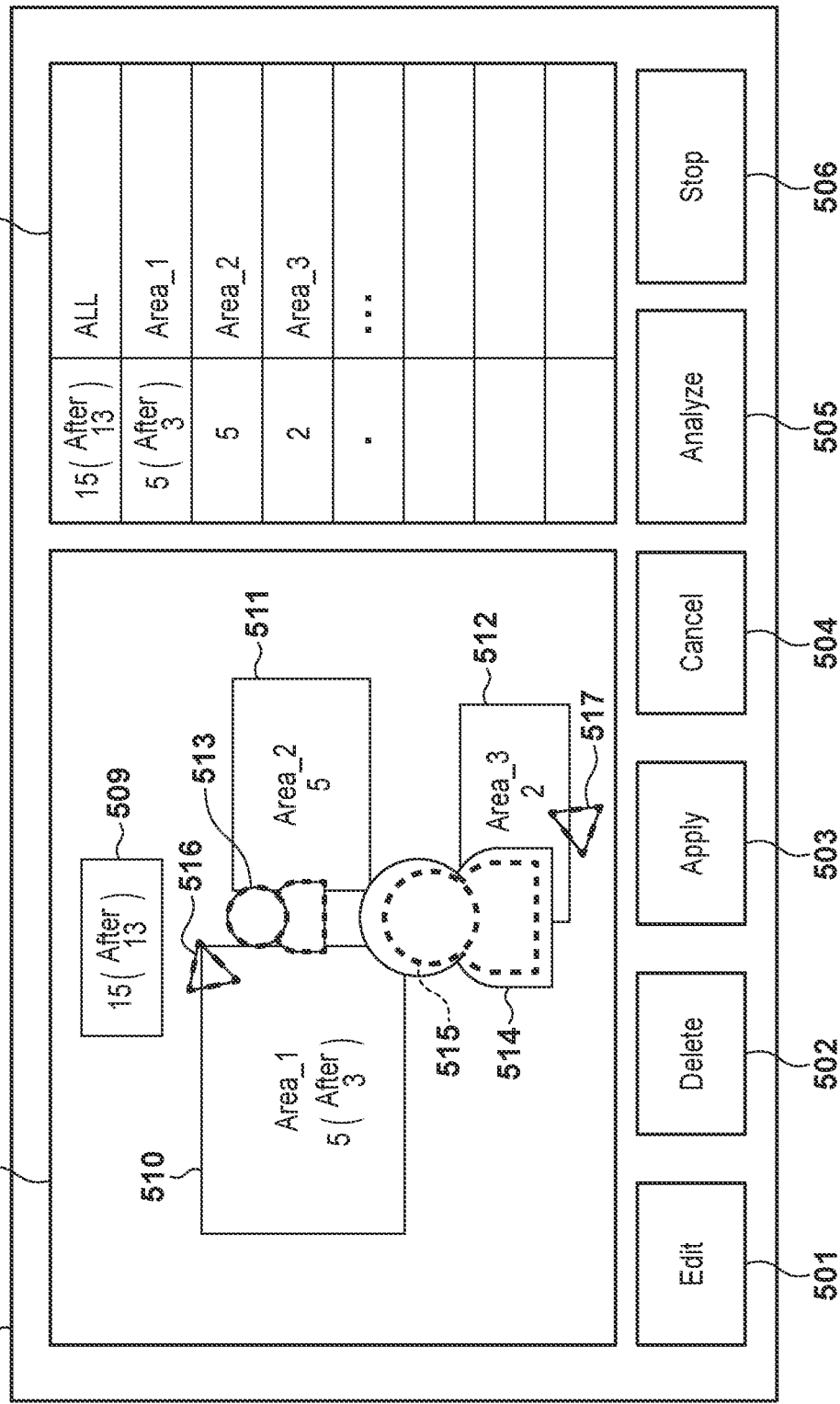

IMAGE PROCESSING APPARATUS AND IMAGE PROCESSING METHOD

BACKGROUND OF THE INVENTION

Field of the Invention

The present invention relates to a technique of detecting an object included in an image.

Description of the Related Art

Conventionally, an object detection apparatus for detecting a human body or the like from an image is known. The object detection apparatus is used to, for example, measure the number of spectators in a stadium or measure the number of visitors in an amusement park. Japanese Patent Laid-Open No. 2018-88049 discloses a technique of correctly detecting the area of a human body or the like from an image.

In object detection using an image, a false positive or false negative may occur when detection settings such as a detection area are changed only slightly. Hence, if appropriate detection settings are not done, an appropriate detection result cannot be obtained. For this reason, a user needs to try various detection conditions and decide an appropriate detection condition while confirming the occurrence of a false positive or false negative. That is, it is difficult and cumbersome for the user to decide the appropriate detection condition.

SUMMARY OF THE INVENTION

According to one aspect of the present invention, an image processing apparatus comprises: an obtaining unit configured to obtain an image captured by an image capturing unit; a display control unit configured to cause a display unit to display first information representing the number of persons who have a size included in a first range that is a range from a first size to a second size larger than the first size; and an acceptance unit configured to accept an operation of changing the first range by a user, wherein the display control unit causes the display unit to display the first information and second information representing the number of persons who have a size included in a second range that is a range based on the operation by the user accepted by the acceptance unit and a range obtained by changing the first range.

The present invention facilitates setting of an appropriate detection condition in detecting an object included in an image.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 is a view exemplarily showing an area display method in the analysis area setting operation;

FIG. 4 is a view showing an example of an operation screen displayed on a display unit; and FIG. 5 is a view showing another example of the operation screen displayed on the display unit.

DESCRIPTION OF THE EMBODIMENTS

Preferred embodiments of the present invention will now be described in detail with reference to the accompanying drawings. Note that the following embodiments are merely examples, and the scope of the present invention is not limited by the embodiments.

First Embodiment

An image processing apparatus according to the first embodiment of the present invention will be described below using, as an example, an information processing apparatus 106 that detects an object from a captured image obtained by an image capturing apparatus 100.

<Arrangements of System and Apparatuses>

Figure 1:
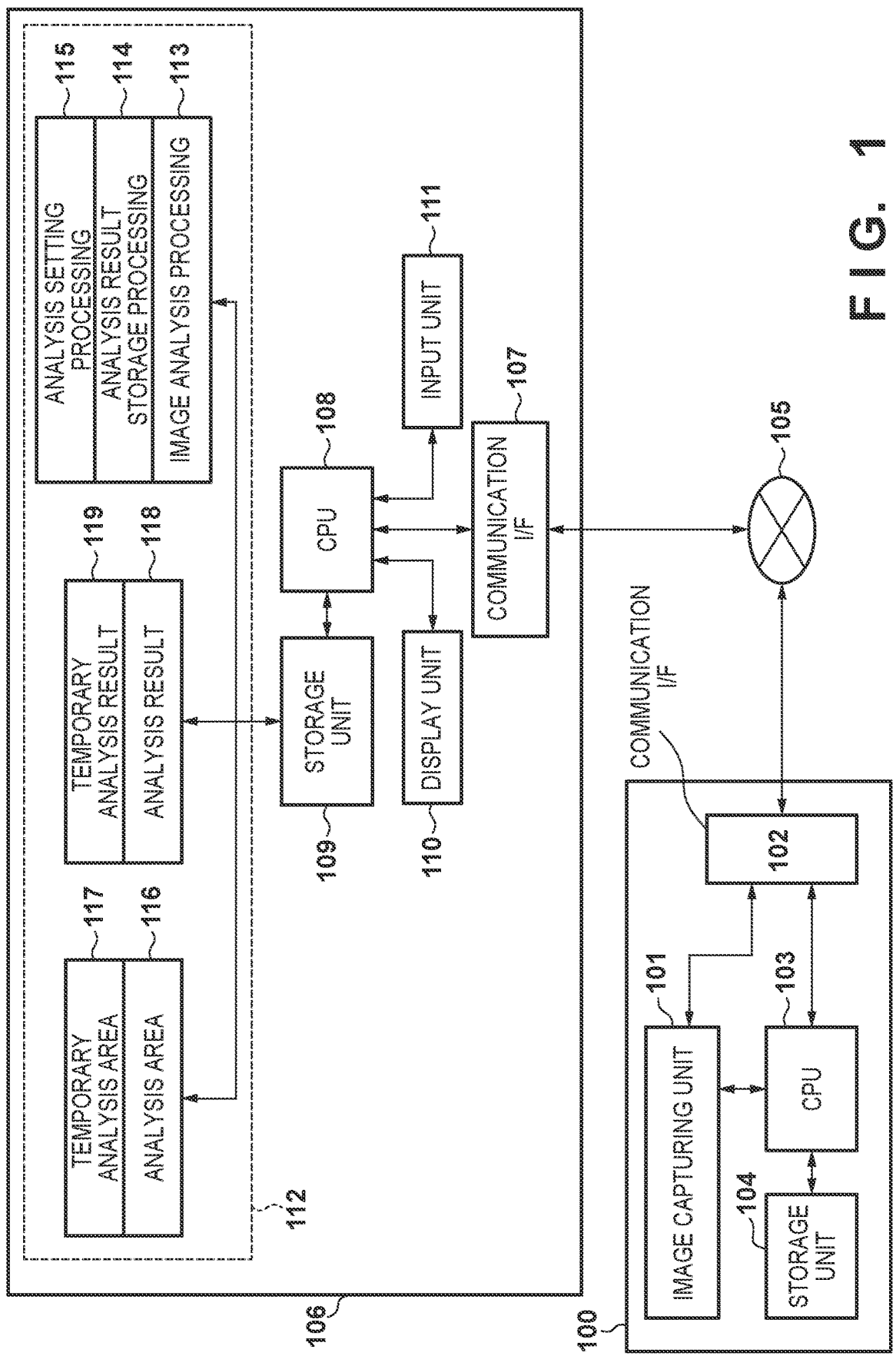
FIG. 1 is a block diagram showing the overall arrangement of an image processing system.

FIG. 1 is a block diagram showing the overall arrangement of an image processing system. The image processing system includes the image capturing apparatus 100 and the information processing apparatus 106. These apparatuses are connected via a network 105 so as to transmit/receive information to/from each other. Here, the image capturing apparatus 100 is a camera that generates an image (still image/moving image) by image capturing, and is, for example, a monitoring image capturing apparatus that captures a predetermined image capturing range. The image capturing apparatus 100 transmits a captured image to the information processing apparatus 106 via the network 105. The image capturing apparatus 100 can be installed on a wall surface or a ceiling, and can receive power supplied via a LAN cable using, for example, PoE®. Note that in the following explanation, the information processing apparatus 106 is assumed to have a form configured to obtain/acquire, in real time, a moving image generated by the image capturing apparatus 100, but may have a form configured to obtain an image stored in a hard disk drive (HDD) or the like in advance. In addition, the image may be a still image or a moving image. FIG. 1 shows one image capturing apparatus 100 and one information processing apparatus 106. However, the system may include a plurality of image capturing apparatuses and/or a plurality of information processing apparatuses.

The image capturing apparatus 100 includes an image capturing unit 101, a communication interface (I/F) 102, a CPU 103, and a storage unit 104.

The image capturing unit 101 includes a lens group serving as an image capturing optical system and an image capturing element such as a CMOS sensor. The image capturing element is a functional unit that converts an optical image formed by the lens group into an electrical signal and outputs it as an encoded image in a predetermined format. Here, for example, frame images are output at 30 fps.

The communication I/F 102 is a functional unit connected to the network 105 to perform communication with an external device. Note that an arbitrary communication standard can be used. For example, Ethernet® or the like can be used as a wired communication standard, and WiFi® or the like can be used as a wireless communication standard. If short-distance communication is usable, Bluetooth®, Zig-Bee®, UWB, or the like, which is a wireless PAN standard, may be used. In addition, if long-distance communication is necessary, a wireless MAN such as WiMAX® or a wireless WAN such as LTE/3G can be used.

The CPU 103 is an arithmetic processing unit configured to control the operation of each unit of the image capturing apparatus 100 by executing a given control program. The storage unit 104 includes storage devices such as a RAM, a ROM, and an HDD. For example, the RAM temporarily stores captured data and various kinds of control data, and is also used as the work memory of the CPU 103. The ROM stores the control program to be executed by the CPU 103 and also stores set values and various kinds of information to be used for control.

Note that the operation of each unit of the image capturing apparatus 100 is assumed here to be controlled by software control of the CPU 103. However, the control may be partially or wholly implemented by hardware control using an ASIC or the like.

The network 105 is formed by a plurality of routers, switches, cables, and the like, which satisfy a communication standard such as Ethernet®. Note that the network may include an Internet service provider (ISP) or an intracompany network in the midway.

The information processing apparatus 106 includes a communication interface (I/F) 107, a CPU 108, a storage unit 109, a display unit 110, and an input unit 111. The information processing apparatus 106 can be, for example, a PC or a portable terminal such as a tablet terminal or a smartphone. The CPU 108 is an arithmetic processing unit configured to control the operation of each unit of the information processing apparatus 106 by executing a given control program. The storage unit 109 includes storage devices such as a RAM, a ROM, and an HDD. For example, the RAM temporarily stores captured data and various kinds of control data acquired from the image capturing apparatus 100 via the network 105, and is also used as the work memory of the CPU 108. The ROM stores the control program to be executed by the CPU 108 and also stores set values and various kinds of information to be used for control. The HDD stores an operating system (OS) and software 112 formed by programs and data.

The software 112 includes, as programs, image analysis processing 113, analysis result storage processing 114, and analysis setting processing 115, and includes, as data, an analysis area 116, a temporary analysis area 117, an analysis result 118, and a temporary analysis result 119. Details of the software 112 will be described later. Note that the operation of each unit of the information processing apparatus 106 is assumed here to be controlled by software control of the CPU 108. However, the control may be partially or wholly implemented by hardware control using an ASIC or the like.

The display unit 110 displays an image acquired from the image capturing apparatus 100 or an analysis result, or an operation screen for analysis area setting to be described later. Note that although various kinds of displays are performed via the display unit 110 in the information processing apparatus 106, the various kinds of displays may be done on a display device (not shown) that is an external device.

The input unit 111 is a functional unit configured to accept a user instruction input such as a mouse input, a keyboard input, a touch input, or a gesture input. For example, when the input unit 111 accepts an instruction to change a setting of the image capturing apparatus 100, the CPU 108 generates a control instruction for the image capturing apparatus 100 based on information representing the instruction, and transmits the control instruction to the image capturing apparatus 100 via the communication I/F 107.

The software 112 will be described next in more detail. As described above, in the software 112, the image analysis processing 113, the analysis result storage processing 114, and the analysis setting processing 115 represent programs, and the analysis area 116, the temporary analysis area 117, the analysis result 118, and the temporary analysis result 119 represent data.

The image analysis processing 113 is a program configured to perform analysis processing (detection processing) of detecting an object from an image. In the following description, a human body is assumed to be a detection target object. However, the embodiment is also applicable to a case of detecting an object other than a human body. In addition, the detection of an object (human body) is not limited to a specific method, and various known methods are usable.

The analysis result storage processing 114 is a program configured to perform determination processing based on the analysis result of the image analysis processing 113 and a given condition and perform processing of storing a determination result. For example, inside/outside determination of an object for a given analysis area is performed as the determination processing. More specifically, inside/outside determination of determining whether each of objects detected by the image analysis processing 113 is located inside or outside of an area represented by the analysis area 116 and/or the temporary analysis area 117 set by the analysis setting processing 115 to be described later is performed. When the inside/outside determination is performed, the number of objects existing in each area can be known. Then, the results of the inside/outside determination concerning the analysis area 116 and the temporary analysis area 117 are saved as the analysis result 118 and the temporary analysis result 119, respectively.

The analysis setting processing 115 is a program configured to do condition setting when performing the image analysis processing 113 and/or the analysis result storage processing 114. More specifically, an operation screen to be described later with reference to FIG. 4 is displayed on the display unit 110, an operation from the user is accepted via the input unit 111, and the analysis area 116 and/or the temporary analysis area 117 is set.

The analysis area 116 is at least one area set and determined by the analysis setting processing 115, and is at least one partial area for an input image. On the other hand, the temporary analysis area 117 is at least one area still undetermined halfway through the setting by the analysis setting processing 115, and is at least one partial area for an input image. In the following explanation, the temporary analysis area 117 is an area set based on the existing analysis area 116 and set to be able to accept correction from the user.

The analysis result 118 and the temporary analysis result 119 are data representing the results of the image analysis processing 113 and the analysis result storage processing 114 concerning the analysis area 116 and the temporary analysis area 117, respectively, as described above.

<Operation of Apparatus>

Figure 2:
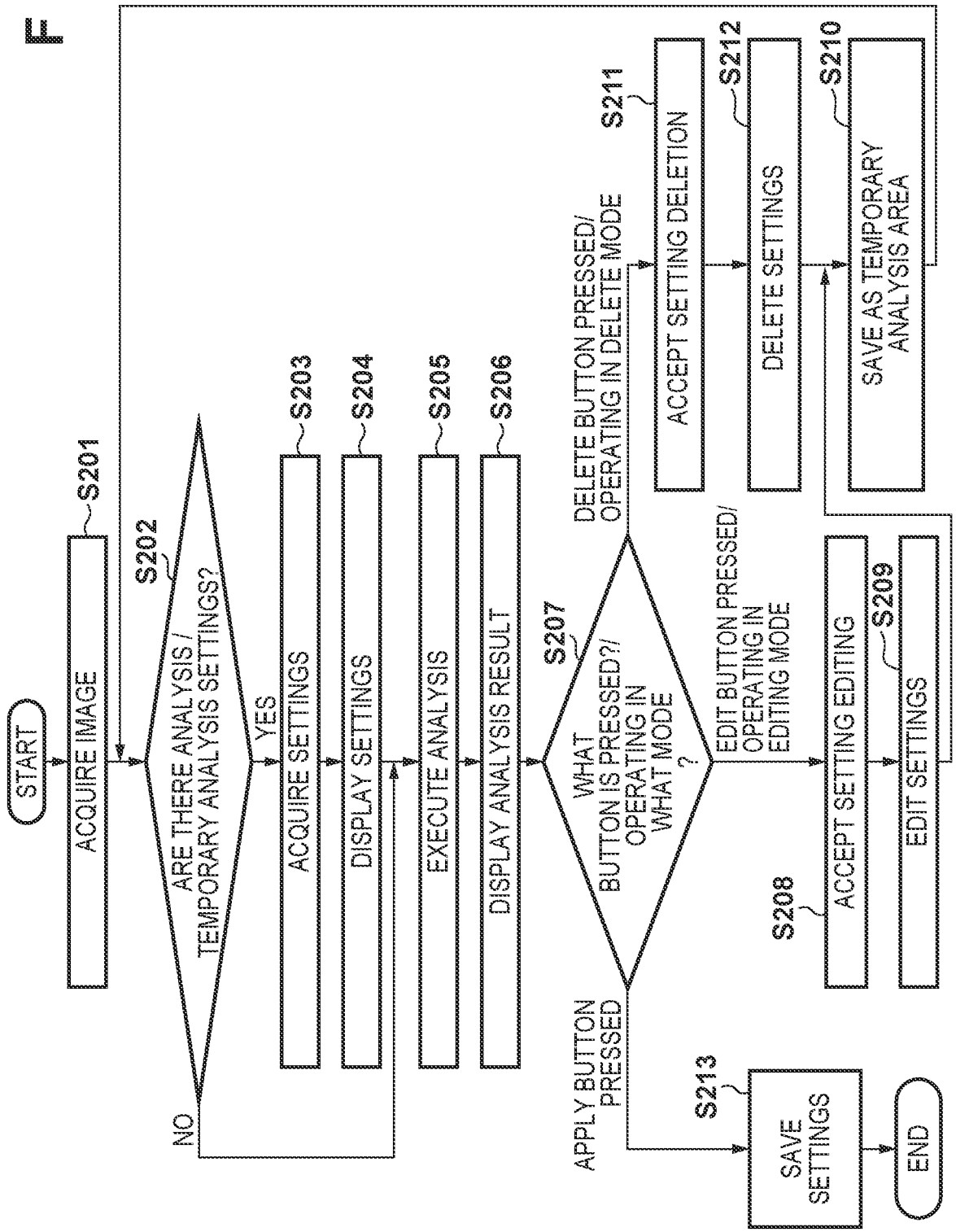
FIG. 2 is a flowchart showing an analysis area setting operation in an information processing apparatus.

FIG. 2 is a flowchart showing an analysis area setting operation in the information processing apparatus 106. The procedure shown in FIG. 2 is started by a trigger when, for example, a user instruction to execute the analysis setting processing 115 is input via the input unit 111. Note that each step to be described below is implemented when the CPU 108 executes a program.

In step S201, the information processing apparatus 106 acquires an image from the image capturing apparatus 100. Here, the image is a moving image, and the information processing apparatus 106 is assumed to sequentially acquire frame images that constitute the moving image.

In step S202, the information processing apparatus 106 confirms whether an analysis setting exists. More specifically, the information processing apparatus 106 confirms whether the analysis area 116 and/or the temporary analysis area 117 exists in the storage unit 109. If the setting exists, the setting is acquired in step S203. If the setting does not exist, the process advances to step S204.

In step S203, the information processing apparatus 106 acquires an analysis setting. More specifically, the analysis area 116 and/or the temporary analysis area 117 is read out from the storage unit 109. Note that in a case in which the process reaches step S203 via step S210 (that is, in the second or subsequent loop), only the temporary analysis area 117 may be acquired.

In step S204, the information processing apparatus 106 displays the analysis setting acquired in step S203 on the display unit 110. More specifically, the analysis area 116 and/or the temporary analysis area 117 acquired in step S203 is displayed. Note that in a case in which the process reaches step S204 via step S210 (that is, in the second or subsequent loop), only the display of the temporary analysis area 117 may be updated.

In step S205, the information processing apparatus 106 executes image processing based on the analysis setting acquired in step S203. Here, the image processing includes the image analysis processing 113 and the analysis result storage processing 114. Note that in a case in which no analysis setting exists, analysis for the entire image area is performed. However, in a case in which no analysis setting exists, analysis may be inhibited. Note that here, when the process reaches step S205, the execution of image processing is assumed to automatically start. Instead, the execution of the image processing may be started by a user operation (for example, pressing of an analyze button 405 to be described later) as a trigger. Additionally, for example, the image processing may be executed when an operation input by the user is absent for a predetermined time.

In step S206, the information processing apparatus 106 displays the result of the analysis in step S205 on the display unit 110. More specifically, the name of each area in the analysis setting and the detection result in each area are displayed. Details of the display will be described later with reference to FIG. 4.

In step S207, the information processing apparatus 106 determines which mode the apparatus is operating in, and branches the processing. More specifically, the processing branches depending on an operation (for example, pressing of a button) by the user or the current operation mode of the information processing apparatus 106. Here, "edit mode", "delete mode", and "browse mode" exist as modes.

The "edit mode" is a mode to accept editing of an area in the existing analysis setting or addition of a new area from the user, and is started by pressing an edit button 401 to be described later. The "delete mode" is a mode to accept deletion of an area in the existing analysis setting from the user, and is started by pressing a delete button 402 to be described later. The "browse mode" is a mode to browse the area represented by the existing analysis setting and the analysis result for the area. The information processing apparatus 106 operates in the browse mode until the edit button 401 or the delete button 402 is pressed. In addition, when an apply button 403 is pressed during the operation in the edit mode or the delete mode, the mode shifts to the browse mode.

In a case in which the process reaches step S207 without going through step S210 (that is, in the first loop), the information processing apparatus 106 is operating in the browse mode, and waits for pressing of the edit button 401 or the delete button 402 by the user. When the edit button 401 is pressed, the process advances to step S208. When the delete button 402 is pressed, the process advances to step S211.

On the other hand, in a case in which the process reaches step S207 via step S210 (that is, in the second or subsequent loop), the information processing apparatus 106 is operating in the edit mode or the delete mode. When the information processing apparatus 106 is operating in the edit mode, and the delete button 402 or the apply button 403 is not pressed, the process advances to step S208 to continue to operate in the edit mode. However, when the delete button 402 is pressed, the process advances to step S211. When the apply button 403 is pressed, the process advances to step S213. Similarly, when the information processing apparatus 106 is operating in the delete mode, and the edit button 401 or the apply button 403 is not pressed, the process advances to step S211 to continue to operate in the delete mode. However, when the edit button 401 is pressed, the process advances to step S208. When the apply button 403 is pressed, the process advances to step S213.

In step S208, the information processing apparatus 106 starts acceptance of setting editing from the user. For example, if this is the first reaching to step S208, and the analysis setting exists in step S203, the same area as the analysis area represented by the analysis setting is displayed as a temporary analysis area. In step S209, the information processing apparatus 106 accepts an analysis area editing operation from the user. For example, the user can select the temporary analysis area and deform the area shape to edit the temporary analysis area by operating the mouse. In addition, a temporary analysis area that is a new area may be added. Note that when the operation is inhibited for the area that is the analysis area, the setting can be maintained for the analysis area.

In step S210, the information processing apparatus 106 saves/updates the current state of the temporary analysis area. Note that as for the timing of saving/updating, the saving may be performed at a predetermined time interval (for example, every time a frame image is acquired), or may be performed at a timing arbitrarily selected by the user. After the saving, the process returns to step S202.

That is, during the operation in the edit mode, the loop of steps S202 to S210 is repetitively executed. Accordingly, both the analysis area that is an existing area and the temporary analysis area that is an area currently under editing are displayed. Since object detection results in the analysis area and the temporary analysis area are also displayed at the same time, the user can easily confirm a change in the detection result by editing.

In step S211, the information processing apparatus 106 starts acceptance of setting deletion from the user. For example, if this is the first reaching to step S211, and the analysis setting exists in step S203, the same area as the analysis area represented by the analysis setting is displayed as a temporary analysis area. In step S212, the information processing apparatus 106 accepts an analysis setting deletion operation from the user. For example, the user can select the temporary analysis area and delete it by operating the mouse. Note that when the operation is inhibited for the area that is the analysis area, the setting can be maintained for the analysis area.

That is, during the operation in the delete mode, the loop of steps S202 to S207, S211 and S212, and S210 is repetitively executed. This allows the user to easily confirm a change in the detection result by the deletion of the area.

In step S213, the information processing apparatus 106 saves the current contents of the temporary analysis area as an analysis area. That is, the user presses the apply button 403 when he/she determines that the temporary analysis area capable of obtaining an appropriate detection result could be set in the edit mode/delete mode, thereby saving the temporary analysis area as a formal analysis area.

Note that the arrangement that always performs execution of analysis in step S205 and display of the analysis result in step S206 has been described above. However, "analyze mode" may separately be added as a mode and executed at an arbitrary timing. At this time, if both the analysis area and the temporary analysis area exist, analysis results are displayed for both areas. For this reason, the user can easily confirm the change in the detection result by editing.

In the above description, the edit mode to change an area and add an area and the delete mode to delete an area have divisionally been described. This aims at reducing a setting error caused by an operation error by the user. However, the edit mode may be configured as an edit mode including change, addition, and deletion of an area. In this case, the change of an area, addition of an area, and deletion of an area can be performed in parallel.

<Display on Operation Screen>

FIG. 3 is a view exemplarily showing an area display method in the analysis area setting operation. That is, FIG. 3 shows a detailed example of the display form of an analysis area and a temporary analysis area in a case in which the information processing apparatus 106 is operating in the edit mode or the delete mode. A solid line indicates an analysis area (an area included in an existing analysis setting), and a broken line indicates a temporary analysis area (an area currently under editing). Note that the display form is not limited to that using solid lines and broken lines, and any display form capable of discriminatively showing the analysis area and the temporary analysis area is usable.

The display method in an initial state will be described first. The initial state is a state immediately after the edit button 401 or the delete button 402 is pressed.

When correcting an area in the edit mode, since an existing analysis area exists, the analysis area indicated by a solid line and a temporary analysis area indicated by a broken line are displayed in a superimposed manner. On the other hand, when adding an area in the edit mode, since no existing analysis area exists, nothing is displayed. In the case of the delete mode, an analysis area indicated by a solid line and a temporary analysis area indicated by a broken line are displayed in a superimposed manner, as in area correction in the edit mode.

The display method during setting will be described next. "During setting" means a state in which the information processing apparatus 106 is operating in the edit mode or the delete mode, and an operation from the user is accepted.

When correcting an area in the edit mode, the broken line shown as the temporary analysis area is operated, thereby performing editing. For example, the user deforms the area shape by a click operation or a drag operation using the mouse. In addition, when the analysis area is displayed as the solid line that cannot be operated, the analysis area before the change and the temporary analysis area after the change can be compared and confirmed. In addition, when image analysis is executed simultaneously, and the analysis result is displayed, the user can confirm the change in the analysis result by editing. When adding an area in editing, a rectangular area of a broken line is added newly as a temporary analysis area, and the area shape is deformed. For example, the user adds a rectangular area of a broken line by the click operation of the mouse, and deforms the rectangular area by the click operation or drag operation. In the case of the delete mode, the temporary analysis area to be deleted is selected and thus deleted. For example, the user performs the click operation using the mouse on the temporary analysis area, thereby deleting the temporary analysis area.

The display method after application will be described finally. The initial state is a state immediately after the apply button 403 is pressed.

When correcting an area in the edit mode, a temporary analysis area indicated by a broken line is set as an analysis area and displayed by a solid line. When adding an area in editing as well, a newly added temporary analysis area of a broken line is set as an analysis area and displayed by a solid line. In the case of the delete mode, display of an analysis area indicated by a solid line is cleared.

In the above-described way, the analysis area before the change, which is the existing area, and the temporary analysis area after the change, which is the area under editing, are displayed together. In particular, the analysis area and the temporary analysis area are displayed identifiably.

FIG. 4 is a view showing an example of an operation screen displayed on the display unit. In particular, an operation screen 400 that is a user interface (UI) displayed on the display unit 110 in the analysis setting processing 115 is shown here.

In the operation screen 400, the edit button 401, the delete button 402, the apply button 403, a cancel button 404, the analyze button 405, a stop button 406, an analysis result list 407, and an image display area 408 are arranged. A state in which an analysis result display 409 and areas 410 to 413 are displayed in the image display area 408 is shown here. Note that in the areas 410 to 413, an area indicated by a solid line is an analysis area, and an area indicated by a broken line is a temporary analysis area. Additionally, an example in which analysis results corresponding to the set states in the image display area 408 are displayed in a list form in the analysis result list 407 is shown.

The edit button 401 is a button used to shift the operation screen 400 to the edit mode. As described above, editing means processing of changing an existing area and adding an area. For example, when the edit button 401 is pressed, the operation screen 400 shifts to the edit mode so that an analysis area is displayed by a solid line, and a temporary analysis area is displayed by a broken line. When adding an area, the new temporary analysis area is added by a broken line. As described with reference to FIG. 3, in the initial state, the temporary analysis area is set and displayed based on the analysis area. This allows the user to easily perform editing based on the existing analysis area.

The delete button 402 is a button used to shift the operation screen 400 to the delete mode. As described above, deletion means processing of deleting an existing area. For example, when the delete button 402 is pressed, the operation screen 400 shifts to the delete mode so that an analysis area is displayed by a solid line, and a temporary analysis area is displayed by a broken line. The user can delete the temporary analysis area by selecting the temporary analysis area.

The apply button 403 is a button used to determine the current temporary analysis area on the operation screen 400 in the edit mode or the delete mode and save it as an analysis area.

The cancel button 404 is a button used to discard the current temporary analysis area on the operation screen 400 in the edit mode or the delete mode. When the cancel button 404 is pressed, the display of the image display area 408 returns to the initial state.

The analyze button 405 is a button used to instruct the start of the image analysis processing 113. In step S205 described above, the image analysis processing 113 is automatically started. In an arrangement for manually starting the processing, the analyze button 405 is used. Additionally, in a state in which the image analysis processing 113 is stopped by the stop button 406, the analyze button 405 is used to resume the image analysis processing 113. The analysis result is displayed in the analysis result list 407 and/or the image display area 408.

The stop button 406 is a button used to stop the image analysis processing 113 started in step S205 or started by pressing the analyze button 405.

Note that although, here, the analyze button 405 and the stop button 406 are arranged on the operation screen 400, the start and stop of the image analysis processing 113 may be done at a predetermined timing without arranging these buttons.

The analysis result list 407 displays detection results obtained by image analysis in a list form. Here, the detection result in the entire image area, the detection results in the area 410 before and after correction, the detection result in the area 412, and the detection result in the area 413 are shown.

More specifically, in the first row, "ALL" is displayed as the name of the analysis result in the entire image area, and "15" that is the analysis result is displayed. This shows that 15 human bodies are detected in the entire image area. Note that since the detection result in the entire image area is not affected by area correction, the number of detected human bodies does not change before and after the change. Note that "ALL" is an example, and it is only necessary to identify the analysis result in the entire image area.

In the second row, "Area_1" is displayed as the area name of the area 410 that is an analysis area, and the analysis results in the area 410 before the correction and the area 411 after the correction are displayed together as "5 (After 3)". This shows that five human bodies are detected in the area 410 before the correction, and three human bodies are detected in the area 411 after the correction.

In the third row, "Area_2" is displayed as the area name of the area 412, and the analysis result "5" is displayed. That is, this is because the area 412 is an area that is still uncorrected, and is both an analysis area and a temporary analysis area. Similarly, in the fourth row, "Area_3" is displayed as the area name of the area 413, and the analysis result "2" is displayed. That is, this is because the area 413 is an area that is still uncorrected, and is both an analysis area and a temporary analysis area.

Note that although the analysis results in the areas 410 and 411 are displayed together as "5 (After 3)" in one row here to make the correspondence relationship clear, another display form may be used. For example, a new row corresponding to the area 411 may be added, "Area_1" may be displayed as the area name of the area 411, and the analysis result "3" may be displayed.

The image display area 408 is an area to display a captured image acquired by the image capturing apparatus or the like. It is assumed here that the frame images that constitute the moving image input from the input unit 111 are sequentially displayed. However, a frame image in which the number of detected objects (human bodies) is relatively large may selectively be displayed. For example, a frame image in which the largest number of objects are detected may be displayed at predetermined time intervals. A composite image that simulates an image with a large number of detected objects may be displayed by compositing a plurality of frame images. In the image display area 408, the areas 410 to 413 that are analysis areas and/or temporary analysis areas are displayed in a superimposed manner. Here, an analysis area that is an existing area is displayed by a solid line, and a temporary analysis area that is an area under editing is displayed by a broken line, as described with reference to FIG. 3. Furthermore, the display 409 that is the analysis result in the entire image area, and the area names and analysis results of the areas 410 to 413 are displayed.

More specifically, the area 410 that is an analysis area is displayed by a solid line, and the area 411 that is a temporary analysis area is displayed by a broken line. The areas 412 and 413 each serving as both an analysis area and a temporary analysis area are each displayed by a solid line and a broken line in a superimposed manner. For each of the areas 410 to 413, the name of the area and the result of inside/outside determination based on the position of each object (human body) are displayed in each area. For example, the area 410 represents that the name is "Area_1", and five human bodies are detected, and the area 411 represents that the name is "Area_1", and three human bodies are detected.

Furthermore, in the analysis result display 409 for the entire image area, "15" is displayed, which indicates that 15 human bodies are detected in the entire image area. Note that the analysis result display 409 in the entire image area is not essential information in changing an area. However, when the number of detected objects in each of the areas 410 to 413 is compared with the analysis result (number of detected objects) in the entire image area, the user can set an appropriate area at a higher possibility.

As described above, according to the first embodiment, editing of a temporary analysis area that is an analysis setting halfway through correction can be accepted during execution of image analysis processing for an analysis area that is an existing analysis setting. That is, the user can continue to confirm the analysis result based on the existing analysis setting without discarding the existing analysis setting in the correction by the user. This allows the user to confirm the result of image analysis processing for the analysis area that is the existing analysis setting without performing a cumbersome operation and more intuitively perform setting (correction) of the temporary analysis area that is the analysis setting halfway through the correction.

In addition, when image analysis processing for the temporary analysis area is executed together, the setting can be done while confirming a false positive or false negative in the temporary analysis area. Furthermore, when the detection result for the analysis area and the detection result for the temporary analysis area are displayed in association with each other, the change before and after the correction can be confirmed, and the user can set (correct) the temporary analysis area more intuitively.

(Modification)

In the above description, the number of detected objects in the analysis area that is the existing analysis setting and the number of detected objects in the temporary analysis area that is the analysis setting halfway through the correction are displayed together, thereby confirming the change in the number of detected objects before and after the correction. For example, when "5 (After 3)" is displayed in "Area_1" in FIG. 4, the user can understand that two objects are not detected by the correction from "Area_1" to "Area_1". At this time, marks for the two objects that are the difference before and after the correction may further be displayed. Accordingly, the user can more intuitively grasp the change in the detection result before and after the correction.

Second Embodiment

In the second embodiment, a form to change the setting of a size filter configured to designate the size range of an object as a detection target will be described. That is, in the first embodiment, only editing/deletion of an analysis area is performed as an analysis setting. In the second embodiment, editing/deletion of the size range of an object as a detection target is further performed. Note that the system arrangement, the apparatus arrangements, and the operations of the apparatuses are almost the same as in the first embodiment, and only different portions will be described. Unlike the first embodiment, the analysis setting includes size setting in addition to the analysis area.

<Arrangement of Apparatus>

In analysis result storage processing 114, size filter processing of excluding an object (human body) that does not fit in a given size range is also performed in addition to inside/outside determination according to the first embodiment. More specifically, size determination is performed to determine whether each object detected by image analysis processing 113 satisfies a size range represented by analysis settings (lower limit display/upper limit display) and/or temporary analysis settings (temporary lower limit display/temporary upper limit display) set by analysis setting processing 115. Then, the AND of the result of inside/outside determination concerning the analysis area and the result of size determination concerning the size range is calculated and saved as an analysis result 118 and a temporary analysis result 119. When the determination concerning the size range is performed, detection of an excessively large object or an excessively small object can be avoided.

The analysis setting processing 115 is a program configured to do condition setting when performing the image analysis processing 113 and/or the analysis result storage processing 114. In the second embodiment, the size range of an object is set as a condition setting. More specifically, an operation screen to be described later with reference to FIG. 5 is displayed on a display unit 110, an operation from the user is accepted via an input unit 111, and analysis settings (lower limit display and upper limit display) and/or temporary analysis settings (temporary lower limit display and temporary upper limit display) are set.

<Display on Operation Screen>

FIG. 5 is a view showing an example of an operation screen displayed on the display unit. In particular, an operation screen 500 that is a user interface (UI) displayed on the display unit 110 in the analysis setting processing 115 is shown here. Here, portions denoted by reference numerals 501 to 509 in FIG. 5 are almost the same as the portions denoted by reference numerals 401 to 409 in FIG. 4, and a description thereof will be omitted. In addition, areas 510, 511, and 512 are the same as the areas 410, 412, and 413 in FIG. 4, and a description thereof will be omitted. In the operation screen 500, display concerning setting of a size filter is added to the operation screen 400 described with reference to FIG. 4.

More specifically, in the image display area 508, the areas 510 to 512 that are analysis areas are superimposed on the captured image. Furthermore, the display 509 that is the analysis result in the entire image area, and the area names and analysis results of the areas 510 to 512 are displayed. Note that in the second embodiment, the detection result (the number of detected human bodies) in each analysis area and within the size range of the size filter is displayed as the analysis result.

In addition, a lower limit display 513 and an upper limit display 514, which are existing analysis settings, and a temporary upper limit display 515 that is an analysis setting halfway through correction are displayed. Note that in an initial state, the same values as those of the existing analysis settings (the lower limit display and the upper limit display) can be set as the temporary analysis settings (the temporary lower limit display and the temporary upper limit display). Note that an example in which the lower limit display 513 and the upper limit display 514 are arranged in the vertical direction near the center of the image display area 508 is shown here. However, the arranging method can arbitrarily be decided. That is, it is only necessary to use display that allows the user to easily compare the lower limit display 513 and the upper limit display 514 with each human body image included in a captured video.

In addition, a UI component 517 used to change the size of the temporary upper limit display 515 and a UI component 516 used to change the size of the temporary lower limit display (superimposed on the lower limit display 513 in FIG. 5) are displayed together. For example, when the user moves the UI component 517 to the lower right side (in a direction to separate from the display of the temporary upper limit display 515) by a drag operation of a mouse, the temporary upper limit display 515 becomes large. When the UI component 517 is moved to the upper left side (in a direction to approach the display of the temporary upper limit display 515), the temporary upper limit display 515 becomes small.

The upper limit display 514 that is the existing analysis setting is displayed by a solid line, and the temporary upper limit display 515 that is the analysis setting halfway through the correction is displayed by a broken line. An example in which size change is performed such that the temporary upper limit display 515 becomes small relative to the upper limit display 514 is shown here. In this way, the existing analysis setting and the analysis setting halfway through the correction are displayed identifiably, as in the first embodiment.

As described above, in the second embodiment, the AND of the result of inside/outside determination and the result of size determination is displayed in each of the areas 510 to 512. For example, the area 510 (the name is "Area_1") shows that five human bodies are detected in an existing size range setting, and three human bodies are detected in the size range setting halfway through the correction. That is, the number of objects that satisfy the size range decreases as the result of making the size of the temporary upper limit display 515 small.

Furthermore, "15 (After 13)" is displayed in the analysis result display 509 in the entire image area. This shows that 15 human bodies are detected in the existing size range setting, and 13 human bodies are detected in the size range setting halfway through the correction.

As described above, according to the second embodiment, editing of an analysis setting (size range) halfway through correction can be accepted while continuing execution of image analysis processing for existing analysis settings (area and size range). That is, the user can continue to confirm the analysis result based on the existing analysis setting without discarding the existing analysis setting in the correction by the user. This allows the user to confirm the result of image analysis processing for the existing analysis setting without performing a cumbersome operation and more intuitively perform an analysis setting (correction of the size range) halfway through the correction.

(Modification)

In the above description, the number of detected objects for the existing size range setting and the number of detected objects for the size range setting halfway through the correction are displayed together, thereby enabling the change in the number of detected objects before and after the correction to be confirmed. For example, when "5 (After 3)" is displayed in "Area_1" in FIG. 5, the user can understand that two objects are not detected when the temporary upper limit display 515 is made smaller than the upper limit display 514. At this time, marks for the two objects that are the difference before and after the correction may further be displayed. Accordingly, the user can more intuitively grasp the change in the detection result before and after the correction.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-118195, filed Jun. 21, 2018 which is hereby incorporated by reference herein in its entirety.

What is claimed is:

1. An image processing apparatus comprising:
one or more processors; and
one or more memories coupled to the one or more processors, the one or more memories having stored thereon instructions which, when executed by the one or more processors, cause the apparatus to:
acquire first information representing a number of objects whose size are included in a first range in an image;
accept an operation, by a user, to change the first range to a second range;
acquire second information representing a number of objects whose size are included in the second range in the image; and
control an output device to output the first information and the second information simultaneously.

2. The apparatus according to claim 1, wherein
the output device is controlled to output information representing the first range and information representing the second range in a superimposed manner on the image.

3. The apparatus according to claim 1, wherein the one or more processors further execute the instructions to:
detect an object in an analysis area of the image, wherein the first information is representing a number of objects whose size are included in a first range in the analysis area and the second information is representing a number of objects whose size are included in a second range in the analysis area.

4. The apparatus according to claim 1, wherein the output device is controlled to output a first guide representing the minimum value of the first range, a second guide representing the maximum value of the first range, a third guide obtained by changing the first guide, and a fourth guide obtained by changing the second guide, in a superimposed manner on the image, and
the second range is a range from a size represented by the third guide to a size represented by the fourth guide.

5. The apparatus according to claim 1, wherein the one or more processors further execute the instructions to:
set the second range instead of the first range to detect the object whose size is included in the second range in the image when accepting an operation of applying the second range as the first range.

6. The apparatus according to claim 5, wherein the second range is a range immediately before the operation is accepted.

7. An image processing method of an image processing apparatus, comprising:
acquiring first information representing a number of objects whose size are included in a first range in an image;
accepting an operation, by a user, to change the first range to a second range;
acquiring second information representing a number of objects whose size are included in the second range in the image; and
controlling an output device to output the first information and the second information simultaneously.

8. The method according to claim 7, wherein the output device is controlled to output information representing the first range and information representing the second range in a superimposed manner on the image.

9. The method according to claim 7, further comprising detecting an object in an analysis area of the image,
wherein the first information is representing a number of objects whose size are included in a first range in the analysis area and the second information is representing a number of objects whose size are included in a second range in the analysis area.

10. The method according to claim 7, wherein the output device is controlled to output and display a first guide representing the minimum value of the first range, a second guide representing the maximum value of the first range, a third guide obtained by changing the first guide, and a fourth guide obtained by changing the second guide in a superimposed manner on the image, and the second range is a range from a size represented by the third guide to a size represented by the fourth guide.

11. The method according to claim 7, further comprising setting the second range instead of the first range to detect the object whose size is included in the second range in the image when an operation of applying the second range as the first range is accepted in the accepting.

12. The method according to claim 11, wherein the second range is a range immediately before the operation is accepted in the accepting.

13. A non-transitory computer-readable recording medium storing a program that causes a computer to:

acquire first information representing a number of objects whose size are included in a first range in an image;

accept an operation, by a user, to change the first range to a second range;

acquire second information representing a number of objects whose size are included in the second range in the image; and control an output device to output the first information and the second information simultaneously.

14. The apparatus according to claim 1, wherein the first information and the second information are displayed on the same display area.

15. The apparatus according to claim 1, wherein the first information and the second information are superimposed on the image.

16. The method according to claim 7, wherein the first information and the second information are displayed on the same display area.

17. The method according to claim 7, wherein the first information and the second information are superimposed on the image.

* * * * *